United States Patent
Manteiga et al.

(10) Patent No.: US 6,886,343 B2
(45) Date of Patent: May 3, 2005

(54) METHODS AND APPARATUS FOR CONTROLLING ENGINE CLEARANCE CLOSURES

(75) Inventors: John A. Manteiga, North Andover, MA (US); Gilbert J. Laidlaw, Gloucester, MA (US)

(73) Assignee: General Electric Company, Schenectady, NY (US)

( * ) Notice: Subject to any disclaimer, the term of this patent is extended or adjusted under 35 U.S.C. 154(b) by 181 days.

(21) Appl. No.: 10/342,770

(22) Filed: Jan. 15, 2003

(65) Prior Publication Data

US 2004/0134199 A1 Jul. 15, 2004

(51) Int. Cl.$^7$ .................................................. F02C 7/20
(52) U.S. Cl. ........................................ 60/772; 60/796
(58) Field of Search ...................... 60/752, 772, 796, 60/798, 800, 804; 29/890.02

(56) References Cited

U.S. PATENT DOCUMENTS

| | | | |
|---|---|---|---|
| 2,591,399 A | * | 4/1952 | Buckland et al. .............. 60/796 |
| 2,594,808 A | * | 4/1952 | Rubbra ......................... 60/796 |
| 4,411,134 A | * | 10/1983 | Moir ............................ 60/796 |
| 4,696,619 A | | 9/1987 | Lardellier |
| 4,950,129 A | | 8/1990 | Patel et al. |
| 5,222,360 A | | 6/1993 | Antuna et al. |
| 5,228,828 A | | 7/1993 | Damlis et al. |
| 5,273,396 A | | 12/1993 | Albrecht et al. |
| 5,281,085 A | | 1/1994 | Lenahan et al. |
| 5,428,952 A | | 7/1995 | Jewess |
| 5,483,792 A | | 1/1996 | Czachor et al. |
| 5,820,024 A | | 10/1998 | Ausdenmoore et al. |
| 5,911,679 A | | 6/1999 | Farrell et al. |
| 6,045,325 A | | 4/2000 | Horvath et al. |

FOREIGN PATENT DOCUMENTS

| | | |
|---|---|---|
| EP | 1316676 | 6/2003 |
| EP | 1382805 | 1/2004 |

* cited by examiner

Primary Examiner—Louis J. Casaregola
(74) Attorney, Agent, or Firm—William Scott Andes; Armstrong Teasdale LLP

(57) ABSTRACT

A method enables a gas turbine engine to be provided. The method comprises providing a ring support that includes a first radial flange, a second radial flange, and a plurality of beams that extend therebetween, within the engine, wherein at least one of the beams is tapered between the first and second radial flanges, and coupling the ring support to a backbone frame, such that the ring support extends substantially circumferentially within the engine.

19 Claims, 3 Drawing Sheets

METHODS AND APPARATUS FOR CONTROLLING ENGINE CLEARANCE CLOSURES

STATEMENT REGARDING FEDERALLY SPONSORED RESEARCH OR DEVELOPMENT

The U.S. Government has rights in this invention pursuant to Contract No. DAAE07-00-C-N086.

BACKGROUND OF THE INVENTION

This invention relates generally to gas turbine engines, more particularly to methods and apparatus for controlling engine clearance closures.

Known turbine engines include a compressor for compressing air which is suitably mixed with a fuel and channeled to a combustor wherein the mixture is ignited for generating hot combustion gases. The gases are channeled to at least one turbine, which extracts energy from the combustion gases for powering the compressor, as well as for producing useful work, such as propelling a vehicle.

To support engine casings and components within harsh engine environments, at least some known casings and components are supported by a plurality of support rings that are coupled together to form a backbone frame. The backbone frame provides structural support for components that are positioned radially inwardly from the backbone and also provides a means for an engine casing to be coupled around the engine. In addition, because the backbone frame facilitates controlling engine clearance closures defined between the engine casing and components positioned radially inwardly from the backbone frame, such backbone frames are typically designed to be as stiff as possible.

At least some known backbone frames used with recouperated engines, include a plurality of beams that extend between forward and aft flanges. To provide structural support and stiffness for the backbone frames, the beams are sized with a width that is substantially constant along a length of the beam, such that the width is as wide as possible, while still permitting physical passage of components and/or services therebetween. The beams are also sized with a thickness that is substantially constant along the beam length, and is limited by thermal induced stresses and component low cycle fatigue (LCF) considerations. More specifically, thicker and wider beams result in a stiffer structure, but are also more susceptible to thermally induced stresses and LCF. Alternatively, thinner and less wide beams are not as susceptible to thermally induced stresses and LCF, but may not provide the necessary stiffness to control engine clearance.

BRIEF DESCRIPTION OF THE INVENTION

In one aspect, a method for assembling a gas turbine engine is provided. The method comprises providing a ring support that includes a first radial flange, a second radial flange, and a plurality of beams that extend therebetween, within the engine, wherein at least one of the beams is tapered between the first and second radial flanges, and coupling the ring support to a backbone frame, such that the ring support extends substantially circumferentially within the engine.

In another aspect of the invention, an apparatus used in a gas turbine engine is provided. The apparatus includes a first radial flange, a second radial flange that is axially spaced from the first radial flange, and a plurality of circumferentially-spaced beams that extend between the first radial flange and the second radial flange. At least one of the plurality of beams is tapered between the first and second radial flanges.

In a further aspect, a gas turbine engine is provided. The engine includes a backbone frame coupled within the gas turbine engine, and a ring support that is coupled to the backbone frame. The ring support includes a first radial flange, a second radial flange, and a plurality of circumferentially-spaced beams that extend between the first and second radial flanges. The plurality of beams include at least one tapered beam extending between the first and second radial flanges.

DETAILED DESCRIPTION OF THE INVENTION

Figure 1:
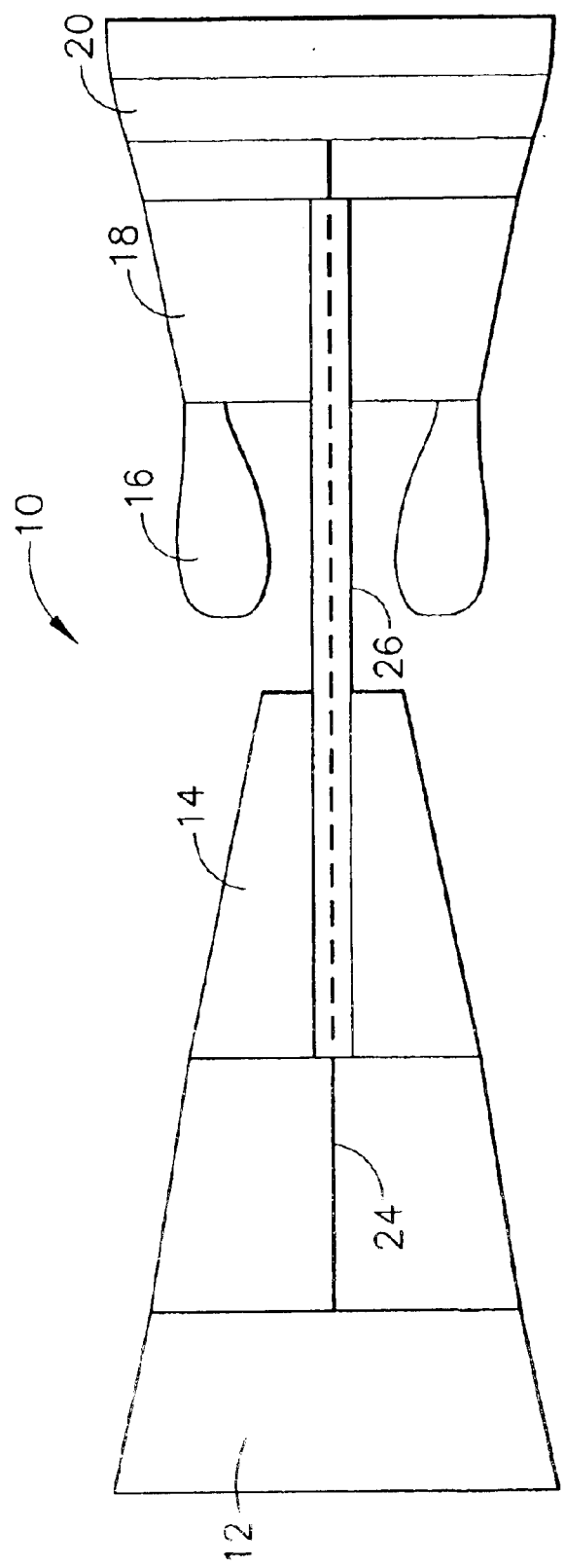
FIG. 1 is a schematic of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 24, and compressor 14 and turbine 18 are coupled by a second shaft 26. In one embodiment, the gas turbine engine is an LV100 available from General Electric Company, Cincinnati, Ohio.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 before exiting gas turbine engine 10.

Figure 2:
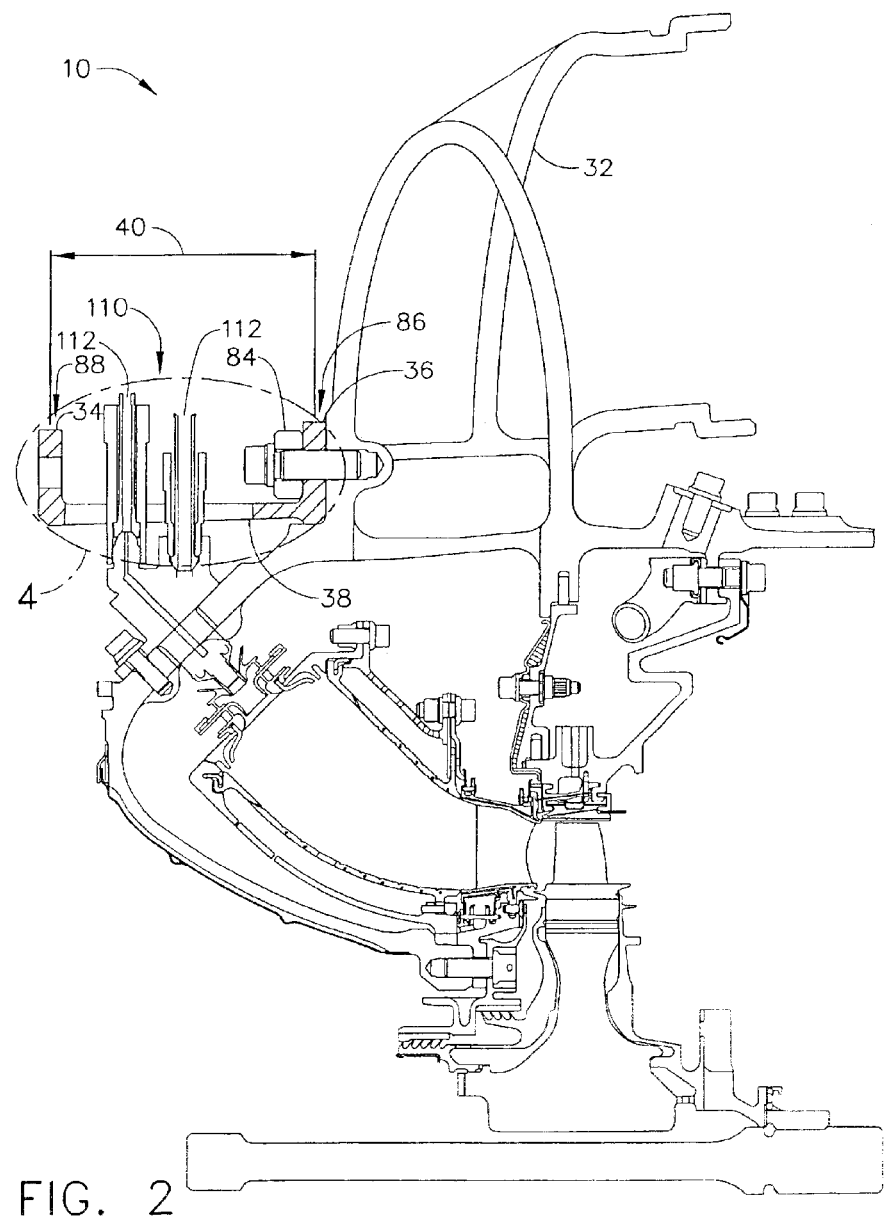
FIG. 2 is a cross-sectional illustration of a portion of the gas turbine engine shown in FIG. 1.
Figure 3:
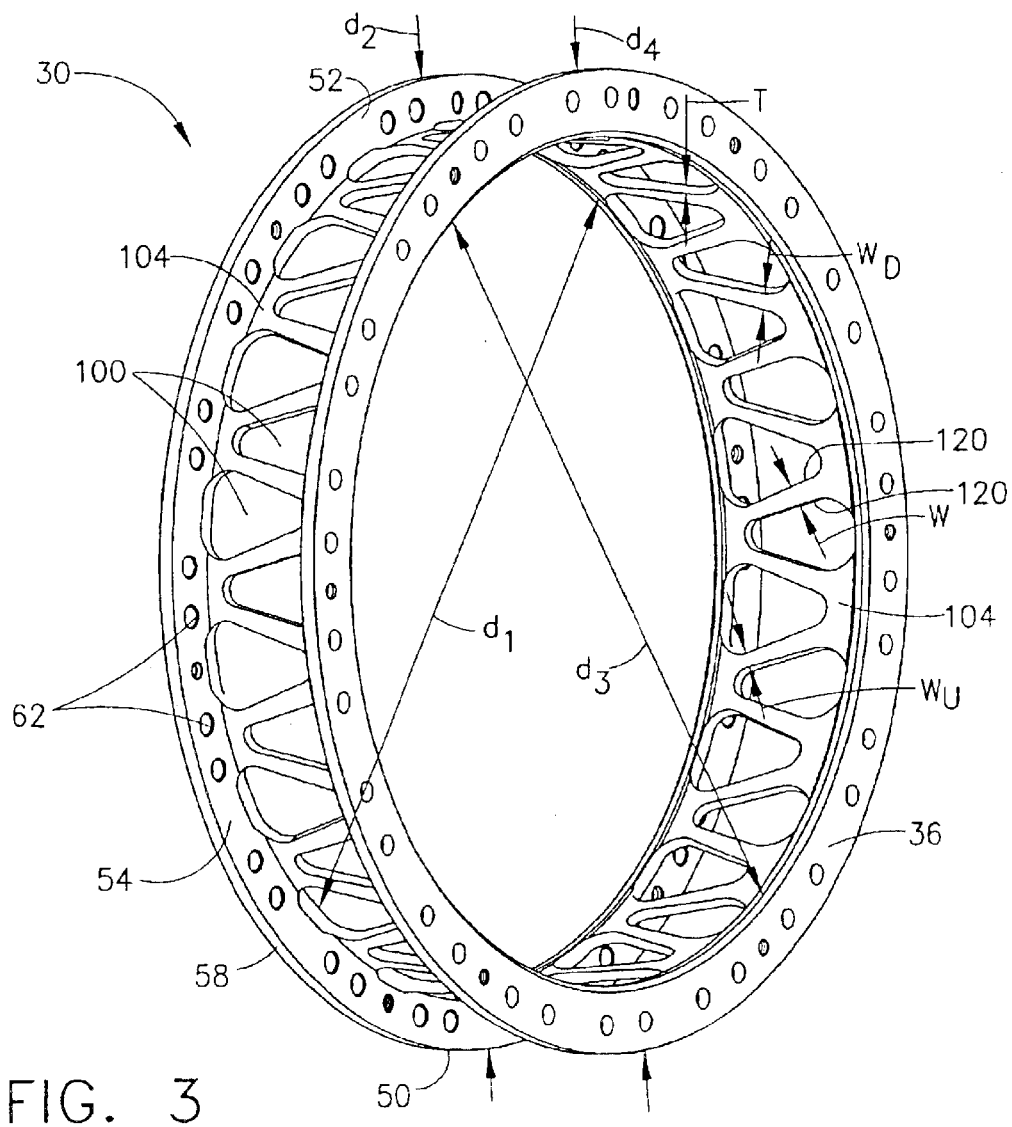
FIG. 3 is a perspective view of a ring support used with the gas turbine engine shown in FIG. 2.
Figure 4:
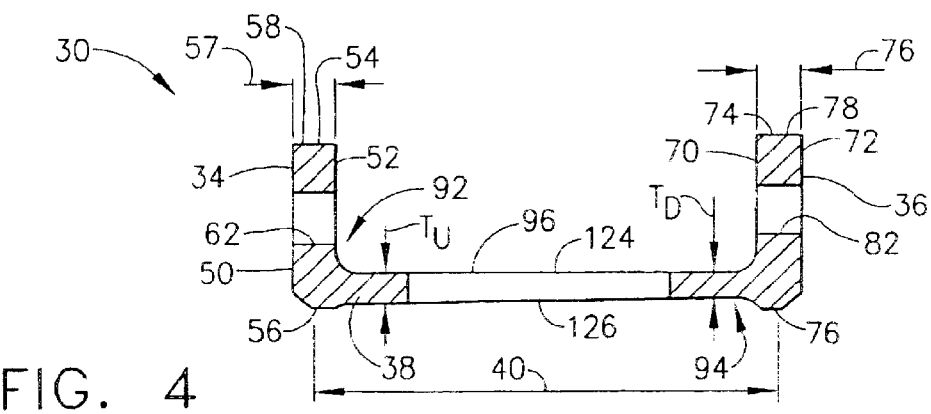
FIG. 4 is an enlarged cross-sectional view of a portion of the gas turbine engine shown in FIG. 2 and taken along area 4.

FIG. 2 is a cross-sectional illustration of a portion of gas turbine engine 10. FIG. 3 is a perspective view of a ring support 30 shown in FIG. 2. FIG. 4 is an enlarged cross-sectional view of a portion of ring support 30. Engine 10 includes a combustor backbone frame 32 that extends circumferentially around combustor 16 to provide structural support to a combustor casing (not shown) that is coupled thereto and extends circumferentially around combustor 16. Engine casing (not shown) is coupled to backbone frame 32 and also extends circumferentially around engine 10.

Ring support 30 is coupled to combustor backbone frame 32. Ring support 30 is annular and includes an annular upstream radial flange 34, an annular downstream radial flange 36, and a plurality of beams 38 that extend therebetween. In the exemplary embodiment, upstream and downstream flanges 34 and 36 are substantially circular and are substantially parallel. More specifically, flange 34 is spaced an axial distance 40 from flange 36, wherein distance 40 defines a width for ring support 30.

Upstream flange 34 includes an upstream surface 50, a downstream surface 52, and a body 54 that extends therebetween. Body 54 has a thickness 56 measured between surfaces 50 and 52, and in the exemplary embodiment, body 54 is substantially planar. Flange 34 also has an inner diameter $d_1$ that is defined by an inner edge 56 of body 54, and an outer diameter $d_2$ that is defined by an outer edge 58 of body 54. A plurality of openings 62 extend through flange 34 between surfaces 50 and 52.

Downstream flange 36 includes an upstream surface 70, a downstream surface 72, and a body 74 that extends therebetween. Body 74 has a thickness 76 measured between surfaces 70 and 72, and in the exemplary embodiment, body 74 is substantially planar. Flange 74 also has an inner diameter $d_3$ that is defined by an inner edge 76 of body 74, and an outer diameter $d_4$ that is defined by an outer edge 78 of body 74. A plurality of openings 82 extend through flange 36 between surfaces 70 and 72. In one embodiment, flange 34 is identical with flange 36. Alternatively, flange 34 is not identical to flange 36.

Ring support 30 is coupled within engine 10 by a plurality of fasteners 84 that extend through openings 62 and 82. Specifically, a downstream end 86 of ring support 30 is coupled to backbone frame 40 by a plurality of fasteners 84 extending through downstream flange openings 82. An upstream end 88 of ring support 30 is coupled to an engine frame (not shown) by a plurality of fasteners 84 extending through upstream flange openings 62. More specifically, ring support 30 is coupled within engine 10 to extend axially between compressor 14 and turbine 18, and provides structural support between compressor 14 and turbine 18.

Beams 38 are spaced circumferentially between flanges 34 and 36, and each beam includes an upstream end 92 extending from upstream flange 34, a downstream end 94 extending from downstream flange 36, and a body 96 extending between ends 92 and 94. In the exemplary embodiment, beams 38 extend obliquely from each flange 34 and 36 such that a plurality of triangular-shaped openings 100 are defined circumferentially around ring support 30. More specifically, in the exemplary embodiment, beams 38 each extend from an inner edge 56 and 76 of each respective flange 34 and 36.

In addition, in the exemplary embodiment, a plurality of web flanges 104 extend between each beam end 92 or 94, and a respective flange 34 and 36. More specifically, in the exemplary embodiment, a pair of adjacent beam ends 92 or 94 extend from each web flange 104. Flanges 104 provide additional structural support between beams 38 and each flange 34 and/or 36.

Openings 100 permit passage of engine components and or engine services 110 therethrough. For example, in the exemplary embodiment, a plurality of fuel injectors 112 are extended through openings 100. Although openings 100 are herein described and illustrated as being substantially triangular-shaped, it should be understood that the specific geometry of apertures 110 and orientation of beams 38 will vary depending on the particular configuration and application of ring support 30. The embodiment illustrated is intended as exemplary, and is not intended to limit the geometry of struts 38 and/or openings 100.

Each beam body 96 has a width W measured between a pair of circumferentially-opposite sidewalls 120. Beam body 96 is tapered such that body width W is variable between flanges 34 and 36. More specifically, body 96 is tapered from upstream flange 34 inwardly towards downstream flange 36 such that a width $W_U$ of each beam upstream end 92 is wider than a width $W_D$ of each beam downstream end 94. Furthermore, each beam body 96 has a thickness T measured between a radially outer side 124 and a radially inner side 126 of each beam 38. Beam body 96 is also tapered in a radial direction such that body thickness T is variable between flanges 34 and 36. More specifically, body 96 is tapered from upstream flange 34 inwardly towards downstream flange 36 such that a thickness $T_U$ of each beam upstream end 92 is wider than a thickness $T_D$ of each beam downstream end 94

In the exemplary embodiment, ring support 30 is fabricated as an integrally-formed one piece assembly. In an alternative embodiment, ring support 30 is fabricated from a plurality of components coupled together.

During operation, as operating temperatures within engine 10 increase, thermal stresses may be induced to ring support 30. More specifically, as temperatures increase, a thermal gradient is induced across ring support 30 between flanges 34 and 36. Because beams 38 are tapered, thermal stresses induced to ring support 30 adjacent downstream flange 36 are facilitated to be reduced. More specifically, tapered beams 38 facilitate balancing and optimizing engine backbone stiffness and part life, such that that thermal low cycle fatigue (LCF) life is extended for ring support 30. Furthermore, because beam upstream ends 92 are thicker and wider than beam downstream ends 94, structural support is provided to ring support 30, and a stiffness of beams 38 is facilitated to be maximized. More specifically, a stiffness of tapered beams 38 facilitates minimizing engine clearance closure caused by maneuver deflection, while increasing engine performance.

The above-described ring support provides a cost-effective and reliable means for controlling engine clearance closure. More specifically, the apparatus provides structural support between the compressor and turbine sections of an engine such that engine clearance closures caused by maneuver deflection are minimized. Moreover, the tapered beams within the ring support provides increased stiffness between the compressor and the turbine such that engine performance may be enhanced in a cost-effective and reliable manner.

An exemplary embodiment of a ring support and backbone structure are described above in detail. The apparatuses illustrated are not limited to the specific embodiments described herein, but rather, components of each may be utilized independently and separately from other components described herein. Each ring support can also be used in combination with other engine components.

While the invention has been described in terms of various specific embodiments, those skilled in the art will recognize that the invention can be practiced with modification within the spirit and scope of the claims.

What is claimed is:

1. A method for assembling a gas turbine engine, said method comprising:

providing a ring support that includes a first radial flange, a second radial flange, and a plurality of beams that extend therebetween, wherein at least one of the beams is tapered between the first and second radial flanges; and coupling the ring support to a backbone frame, such that the ring support extends substantially circumferentially within the engine.

2. A method in accordance with claim 1 wherein coupling a ring support further comprises coupling a ring support to the backbone frame that includes at least one beam that has a width that is variable between the first and second radial flanges.

3. A method in accordance with claim 1 wherein coupling a ring support further comprises coupling a ring support to the engine that includes at least one beam that has a thickness that is variable between the first and second radial flanges.

4. A method in accordance with claim 1 wherein coupling a ring support further comprises coupling the ring support to the engine such that a thinner portion of the ring support is adjacent the backbone frame.

5. A method in accordance with claim 1 wherein the first radial flange is at a first operating temperature during operation and the second radial flange is at a second operating temperature during operation, the first operating temperature being less than the second operating temperature, coupling a ring support further comprises coupling the ring support to the engine such that during engine operation, a thicker portion of the ring support has a first operating temperature that is less than a second operating temperature of a thinner portion of the ring support.

6. A method in accordance with claim 1 wherein coupling a ring support further comprises coupling the ring support to the engine to facilitate reducing stresses induced to the backbone frame.

7. An apparatus used in a gas turbine engine, said apparatus comprising:
   a first radial flange;
   a second radial flange axially spaced from said first radial flange; and
   a plurality of circumferentially-spaced beams extending between said first radial flange and said second radial flange, at least one of said beams is tapered between said first and second radial flanges, said at least one beam comprises a first end, a second end, and a body extending therebetween, said body has a variable thickness extending between said first and second ends.

8. Apparatus in accordance with claim 7 wherein said at least one beam comprises a first end, a second end, and a body extending therebetween, said body having a variable width extending between said first and second ends.

9. Apparatus in accordance with claim 7 wherein said at least one beam comprises a first body portion coupled to said first radial flange, and a second body portion extending between said first body portion and said second radial flange, said apparatus coupled within said engine such that said second body portion is exposed to higher operating temperatures than said first body portion.

10. Apparatus in accordance with claim 9 wherein said first body portion is thicker than said second body portion.

11. Apparatus in accordance with claim 9 wherein said first body portion coupled within said engine upstream from said second body portion.

12. Apparatus in accordance with claim 7 wherein said at least one beam facilitates reducing stresses induced to said apparatus.

13. A gas turbine engine, comprising:
   a backbone frame coupled within said gas turbine engine; and
   a ring support coupled to said backbone frame and comprising a first radial flange, a second radial flange, and a plurality of circumferentially-spaced beams extending between said first and second radial flanges, said plurality of beams comprising at least one tapered beam extending between said first and second radial flanges.

14. A gas turbine engine in accordance with claim 13 wherein said at least one beam comprises a first end coupled to said first radial flange, a second end coupled to said second radial flange, and a tapered body extending therebetween, said body having a variable width extending between said first and second ends.

15. A gas turbine engine in accordance with claim 13 wherein said at least one beam comprises a first end coupled to said first radial flange, a second end coupled to said second radial flange, and a tapered body extending therebetween, said body having a variable thickness extending between said first and second ends.

16. A gas turbine engine in accordance with claim 13 wherein said at least one beam comprises a first body portion and a second body portion, said first body portion extending from said first end to said second body portion, said second body portion extending from said first body portion to said second end, said first body portion thicker than said second body portion.

17. A gas turbine engine in accordance with claim 16 wherein said second body portion is downstream from said first body portion, and is exposed to higher operating temperatures than first body portion.

18. A gas turbine engine in accordance with claim 16 wherein said second body portion facilitates reducing stresses induced to said backbone frame.

19. A gas turbine engine in accordance with claim 16 wherein said second body portion facilitates extending a useful life of said backbone frame.

\* \* \* \* \*